3,729,522
METHOD FOR PREPARING LOW COLOR POLYPHENYLS AND HALOGENATED POLYPHENYLS
Gene L. Arnett, Weaver, and William B. Dunlap, Anniston, Ala., assignors to Monsanto Company, St. Louis, Mo.
No Drawing. Filed Dec. 2, 1970, Ser. No. 94,587
Int. Cl. C07c 7/00
U.S. Cl. 260—674 R                             11 Claims

ABSTRACT OF THE DISCLOSURE

A process for the treatment of polyphenyls to improve the color thereof wherein crude polyphenyls comprised predominantly of terphenyl and quaterphenyl are contacted with alkali metal at a temperature of about 225° C. and for a period of time sufficient to substantially reduce the color of the polyphenyl. Halogenated polyphenyls prepared from the treated polyphenyl have exceptionally good color and are particularly useful as plasticizers in color critical applications.

BACKGROUND OF THE INVENTION

Field of the invention

This invention relates to the preparation of polyphenyls and particularly to a method for refining crude polyphenyls to yield an essentially colorless product which when halogenated and distilled yields a low color halogenated polyphenyl.

Description of the prior art

Polyphenyls are widely used in the chemical industry as plasticizers and heat transfer fluids, and as intermediates in the synthesis of a variety of other useful products. Of such products, the halogenated polyphenyls and particularly chlorinated terphenyl are widely used in such diversified applications as heat transfer and hydraulic fluids, viscosity control agents for molding compositions, flame retardants for organic compositions, and as plasticizers for coatings, adhesives, laquers, inks, varnishes, pigment dipersions and the like. Halogenated polyphenyls are commonly used as plasticizers for polyvinyl chloride, ethylene vinyl acetate, epoxy resins, polyethylene, polystyrene, polyurethane, phenolic resins, rubbers, and the like.

In many of these applications, the color of the polyphenyl or halogenated polyphenyl is of great importance. In plasticizers and in molding or coating compositions especially, polyphenyls of poor color can adversely affect the color of the final product. Producers of polyphenyls and halogenated polyphenyls accordingly strive to produce a product which is as close to colorless as possible.

Polyphenyls commercially available for production of halogenated material are generally obtained as a byproduct of the manufacture of biphenyls by pyrolysis of benzene. The biphenyl is separated by distillation from the polyphenyl tars and high boilers, and polyphenyls comprising a major amount of terphenyl and a minor amount of quaterphenyl are in turn recovered by vacuum distillation from the tars and high boilers. The recovered polyphenyls are then halogenated to predetermined levels of halogen and distilled to yield products useful as plasticizers and the like. Of the halogenated polyphenyls, chlorinated terphenyl optionally containing up to about 20% chlorinated quaterphenyl is the most widely used and the most important commercially.

Polyphenyls prepared and recovered in accordance with the above procedures generally have a color in the range of from medium yellow to light brown which corresponds to color values of from 2 to 3 on the NPA (National Petroleum Association) scale. Upon halogenation, additional coloration occurs and the crude halogenated product commonly appears as a very dark brown or black material. Multiple distillation of crude halogenated polyphenyl is effective to reduce the color thereof to a level of about 1.75 NPA which appears visually as a light yellow. For color critical applications however, it is desirable that the color of the halogenated polyphenyl be less than about 1.25 and preferably less than 1.0 NPA. Color reductions to this extent are not possible by conventional distillation and refining procedures.

SUMMARY

It is an object of the present invention to provide a method for reducing the color of polyphenyl. It is a further object of this invention to provide a method for preparing halogenated polyphenyls having exceptionally low color and particularly to provide a method for preparing chlorinated polyphenyl comprising a major amount of terphenyl having a color of less than about 1.25 NPA.

To achieve the objects of this invention, crude polyphenyls, e.g., those recovered by simple distillation from the manufacture of biphenyl, are treated by contacting with an alkali metal, e.g., sodium, lithium, or potassium, at a temperature above the melting point of the alkali metal and preferably above about 200° C., and for a time sufficient to decrease the color of the polyphenyl. The color of the polyphenyl is decreased by the treatment from a level of 2–3 NPA to less than about 2.0 Gardner. The treated polyphenyl is filtered to remove solid residue and unreacted metal. The treated polyphenyl is useful as a plasticizer and heat transfer agent, and is particularly useful in the preparation of chlorinated polyphenyls having exceptionally low color for use as plasticizers in color critical applications.

DESCRIPTION OF PREFERRED EMBODIMENTS

Color reduction of polyphenyls in accordance with the present invention is accomplished by contacting a polyphenyl with an alkali metal such as sodium, lithium or potassium at a temperature above the melting point of the metal but below the decomposition temperature of the polyphenyl. The contacting is conveniently accomplished by adding an alkali metal to polyphenyl in a reactor equipped with an agitator. During the treatment the color of the crude polyphenyl is observed to change from a black or a dark brown to a dull red, and then to essentially disappear leaving the polyphenyl as a substantially colorless product. The alkali metal meanwhile becomes coated with a black material which has the appearance of carbon. Filtration or decantation to remove the black material and unreacted alkali metal yields refined polyphenyl which is nearly colorless in the molten state and which solidifies to a clean white product.

Polyphenyls employed in the method of the present invention may be comprised of terphenyl and quaterphenyl obtained as a secondary product in the pyrolysis of benzene to prepare biphenyl as hereinbefore described. Polyphenyls obtained in this manner commonly comprise a major proportion of at least about 60% terphenyl and a minor proportion of quaterphenyl. If desired the terphenyl and quaterphenyl can be separated by fractionation into products consisting essentially of terphenyl or quaterphenyl. Such fractionated products can be employed as crude polyphenyl in the method of this invention.

Halogenated polyphenyls encompass polyphenyls as herein defined when halogenated with chlorine, bromine or fluorine to contain from about 30% by weight up to the maximum theoretical weight percent for a completely halogenated polyphenyl.

The alkali metals useful in the method of the present invention include the elemental form of the metals of Group I–A of the Periodic Table of Elements, the preferred metals being sodium, potassium and lithium. Most metals of Group I–A are commercially available in many forms such as flake, chip, crystal, rods, sheet and granule, any of which can be used in the process of this invention.

The polyphenyl and alkali metal are contacted at temperatures above the melting point of the alkali metal and preferably above about 200° C. or higher, with a preferred temperature range being from about 200° C. to 250° C. Maximum treatment temperature is only limited by the thermal stability and volatility of the polyphenyl being treated, but a temperature of about 300° C. is generally considered a practical maximum. During the treatment period the mixture is agitated to keep the metal suspended in a substantially uniform manner throughout the polyphenyl in order to facilitate contact between the metal and the polyphenyl.

The time required for the treatment depends to some extent upon the treatment temperature and the quantity and kind of alkali meal employed. When contacting crude polyphenyl with from about 1% to 1.5% by weight sodium metal at temperatures of from 210° C. to 250° C., contact times in the order of 30 minutes to 2 hours are sufficient to substantially completely remove all the color from the polyphenyl, the shorter times occurring at the higher temperatures and higher sodium concentrations. When treating crude polyphenyl with 4% by weight potassium at 225° C., substantially complete color removal is obtained in 15 minutes or less. As a practical matter, the required time for any particular conditions of treatment can be readily determined by observation of the polyphenyl during treatment, and may range from about 1 minute to 2 hours or more.

A slight excess of alkali metal is preferably provided for the treatment so that a portion of the metal remains in the mixture at the conclusion of the treatment period. In most instances, an amount of metal equal to at least 0.5% by weight of the polyphenyl being treated is required although lesser amounts may be used in the event the crude polyphenyl is of unusually fine quality. In general, from about 1% to 5% by weight of alkali metal based upon the weight of polyphenyl treated is usually effective to remove substantially all the color from crude terphenyl, and in most instances from about 1% to about 1.5% by weight of alkali metal will effectively reduce the color of crude polyphenyl from 2–3 NPA to 3.0 Gardner or less. Excess alkali metal can of course be empolyed if desired and although the required time for treatment may be diminished somewhat thereby, no advantage is gained in the quality of the final product and the benefits derived through the use of excess alkali metal are generally not commensurate with added expense occasioned thereby.

With respect to color measurement, it is noted that although the color of the crude material is measured on the NPA scale, the color of the refined polyphenyl is less than 0.5 NPA and meaningful measurements cannot be made on this scale. The color of refined material is accordingly measured against the Gardner color standards which distinguish small differences between such low color materials.

As stated above, the refined polyphenyl solidifies to a clean white material which is a commercial product of enhanced value. The refined polyphenyl can also be utilized as an improved intermediate to prepare other commercial products of enhanced value. For example, preparation of chlorinated polyphenyl in accordance with conventional halogenation procedures including chlorination and distillation of the chlorinated product yields a product of exceptionally low color. Chlorinated polyphenols comprising about 85% terphenyl and 15% quaterphenyl and containing from about 30% to 62% chlorine prepared in this manner have color levels of 1.25 NPA or less. These products may be compared with chlorinated polyphenyls prepared from conventional polyphenyl which have color levels of from 1.75 to 2.5 NPA. Low color chlorinated polyphenyls are particularly desirable for use as plasticizers for light colored resins and plastics in color critical applications where conventional chlorinated polyphenyls impart a yellow or off-color cast to the finished goods.

The following examples are presented to illustrate the invention. NPA color values were determined according to ASTM Method D–155–45T (1952). All percentages expressed in the examples are by weight.

EXAMPLE 1

To a two-liter flask equipped with an agitator was charged 1,000 grams of distilled polyphenyl consisting of a mixture of 88% terphenyl and 12% quaterphenyl and having a color level of 2.5 NPA. To the polyphenyl was added 12.5 grams of sodium metal chips. The polyphenyl and sodium metal were heated together to 225° C. and held at this temperature with stirring for about 1.5 hours. During the reaction the color of the polyphenyl was observed to change from brown to a dull red and to finally disappear leaving an essentially colorless material. The sodium metal was observed to become coated with a black substance during the reaction. Unreacted sodium metal and the black deposits were removed from the polyphenyl by filtration and the filtered material was determined to have a color level of less than 2.0 Gardner. Upon cooling, the refined polyphenyl formed a white solid.

A quantity of the refined polyphenyl was chlorinated to a level of 60% chlorine using conventional chlorination techniques. The crude chlorinated material was of a very dark brown color, but simple distillation following conventional procedures for the production of chlorinated terphenyl yielded a product with a color of less than 1.25 NPA.

EXAMPLE 2

The method of Example 1 was repeated contacting 1,000 grams of distilled polyphenyl with 40 grams of potassium metal for 15 minutes at 225° C. After filtration to remove unreacted metal and solid residues, the refined polyphenyl was determined to have a color of 2.0 Gardner in the molten state.

EXAMPLE 3

The method of Example 1 was repeated contacting 1,000 grams of distilled polyphenyl with 40 grams of lithium metal for 1 hour at 225° C. After filtration to remove unreacted metal and solid residues, the refined polyphenyl was determined to have a color of 2.0 Gardner in the molten state.

Although the reaction between the polyphenyl and metallic sodium is conveniently accomplished batch-wise in a stirred reactor, the method of treatment is not limited thereto but may also be accomplished in a continuous manner, as for example by passing the polyphenyl through a column containing molten alkali metal. Design of such a continuous system, although complicated by special precautions which must be observed in handling the alkali metal, is nevertheless within the scope of the present day engineering technology. The method whereby the contact between the polyphenyl and alkali metal is obtained is therefore not critical to the practice of the present invention.

It is further within the scope of the present invention to separately treat specific components of polyphenyls, e.g., terphenyls or quaterphenyls, which can then be utilized indivdually or mixed in any desired proportion to form the final composition. It is also within the scope of this invention to employ mixtures of alkali metals as the contacting agent. It will be apparent to those skilled in the art that the process of this invention should be carried out in closed anhydrous systems to reduce the hazards of handling molten alkali metals.

With the teachings of the present invention in hand, certain variations and modifications thereof will be apparent to those skilled in the art and such variations and modifications may be made without departing from the spirit of this invention. Accordingly, the invention is not to be limited except as defined in the claims.

The embodiments of this invention in which an exclusive property or privilege is claimed are defined as follows:

1. The method of treating polyphenyls which comprises contacting a polyphenyl with alkali metal at a temperature of from the melting point of said alkali metal to about 300° C. for a time sufficient to decrease the color of said polyphenyl, and thereafter separating the polyphenyl from alkali metal residue.

2. A method of claim 1 wherein the polyphenyl is contacted with from about 0.5% to 5% by weight of alkali metal based upon the weight of the polyphenyl.

3. A method of claim 1 wherein the temperature is from about 200° C. to 250° C.

4. A method of claim 1 wherein the contact time is from about 1 minute to 2 hours.

5. A method of claim 1 wherein the alkali metal is selected from the group consisting of sodium, potassium, lithium, and mixtures thereof.

6. A method of claim 1 wherein the polyphenyl is selected from the group consisting of terphenyls, quaterphenyls, and mixtures thereof.

7. A method of claim 6 wherein the polyphenyl is comprised of a major amount of at least 60% terphenyl and a minor amount of quaterphenyl.

8. A method of claim 6 wherein the polyphenyl is contacted with from about 0.5% to 5% by weight of polyphenyl of alkali metal selected from the group consisting of sodium, potassium, lithium, and mixtures thereof.

9. A method of claim 6 wherein the temperature is from about 200° to 250° C.

10. A method of claim 6 wherein the contact time is from about 1 minute to 2 hours.

11. A method of claim 6 wherein the polyphenyl is contacted with from about 1% to 1.5% by weight of polyphenyl of alkali metal selected from the group consisting of sodium, potassium, lithium, and mixtures thereof, at a temperature of about 225° C., for a period of time of from about 15 minutes to 2 hours.

References Cited
UNITED STATES PATENTS

| | | | |
|---|---|---|---|
| 3,424,801 | 1/1969 | Carlson | 260—613 R |
| 3,532,758 | 10/1970 | Gieseking | 260—609 C |
| 2,927,074 | 3/1960 | Barger et al. | 260—674 R |
| 2,979,548 | 4/1961 | Clarke | 260—674 R |
| 3,274,277 | 9/1966 | Bloch | 260—670 |

CURTIS R. DAVIS, Primary Examiner

U.S. Cl. X.R.

260—649 R, 670